US012626166B2

(12) United States Patent
Figueredo de Santana et al.

(10) Patent No.: US 12,626,166 B2
(45) Date of Patent: May 12, 2026

(54) PREDICTING THE NEED FOR XAI IN ARTIFICIAL INTELLIGENCE SYSTEMS

(71) Applicant: INTERNATIONAL BUSINESS MACHINES CORPORATION, Armonk, NY (US)

(72) Inventors: Vagner Figueredo de Santana, São Paulo (BR); Ana Fucs, Rio de Janeiro (BR); Vinicius Costa Villas Boas Segura, Rio de Janeiro (BR); Daniel Brugnaro De Moraes, São Paulo (BR); Renato Fontoura de Gusmao Cerqueira, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 956 days.

(21) Appl. No.: 17/807,039

(22) Filed: Jun. 15, 2022

(65) Prior Publication Data

US 2023/0409935 A1 Dec. 21, 2023

(51) Int. Cl.
*G06N 20/00* (2019.01)
*G06F 11/34* (2006.01)
(Continued)

(52) U.S. Cl.
CPC ......... *G06N 5/045* (2013.01); *G06F 11/3438* (2013.01); *G06F 18/214* (2023.01); *G06F 18/22* (2023.01)

(58) Field of Classification Search
CPC ...... G06N 5/045; G06N 3/08; G06F 11/3438; G06F 18/214; G06F 18/22
See application file for complete search history.

(56) References Cited

U.S. PATENT DOCUMENTS 8,078,554 B2    12/2011    Fung
11,049,043 B2    6/2021    Dalli
(Continued)

FOREIGN PATENT DOCUMENTS

CN    112101574 B    12/2020
CN    113518999 A    10/2021
(Continued)

OTHER PUBLICATIONS

Ramon, Yanou, et al. "How should artificial intelligence explain itself? understanding preferences for explanations generated by XAI algorithms." Understanding Preferences for Explanations Generated by XAI Algorithms (Jun. 30, 2021). Columbia Business School Research Paper (2021) (Year: 2021).*
(Continued)

*Primary Examiner* — Andrew T McIntosh
(74) *Attorney, Agent, or Firm* — Gavin Giraud

(57) ABSTRACT
A method, computer program, and computer system are provided for selecting an artificial intelligence algorithm. Data corresponding to a user interaction with an artificial intelligence system is received. A need by the user for an explanation associated with the artificial intelligence system is identified based on the received data corresponding to the user interaction with the artificial intelligence system. An artificial intelligence algorithm is selected from among a plurality of artificial intelligence algorithms. The selected artificial intelligence algorithm includes an explainable artificial intelligence component. A model is created for the the selected artificial intelligence algorithm corresponding to the received data.

17 Claims, 6 Drawing Sheets

300

(51) Int. Cl.
    *G06F 18/214*         (2023.01)
    *G06F 18/22*           (2023.01)
    *G06N 5/045*         (2023.01)

(56)         References Cited

U.S. PATENT DOCUMENTS

| | | | |
|---|---|---|---|
| 2018/0158552 A1 | 6/2018 | Liu | |
| 2019/0244122 A1 | 8/2019 | Li | |
| 2019/0303404 A1 | 10/2019 | Amer | |
| 2019/0378006 A1 | 12/2019 | Fukuda | |
| 2020/0294231 A1 | 9/2020 | Tosun | |
| 2020/0380556 A1* | 12/2020 | Ainscough | G06N 5/02 |
| 2021/0232940 A1* | 7/2021 | Dalli | G06N 3/08 |
| 2022/0012565 A1* | 1/2022 | Hansen | G06N 3/044 |
| 2022/0036221 A1 | 2/2022 | Hargras | |
| 2022/0277192 A1* | 9/2022 | Gou | G06N 3/0464 |
| 2023/0245197 A1* | 8/2023 | Iyer | G06N 7/01 |
| | | | 705/26.7 |
| 2024/0078473 A1* | 3/2024 | Laszczuk | G06N 20/20 |
| 2025/0342394 A1* | 11/2025 | St-Amant | G06N 20/00 |

FOREIGN PATENT DOCUMENTS

| | | | |
|---|---|---|---|
| WO | 2017186048 A1 | 11/2017 | |
| WO | 2020123985 A1 | 6/2020 | |
| WO | 2021137897 A1 | 7/2021 | |

OTHER PUBLICATIONS

Henin, Clément, and Daniel Le Métayer. "A multi-layered approach for tailored black-box explanations." International conference on pattern recognition. Cham: Springer International Publishing, 2021 (Year: 2021).*

Adadi, et al., "Peeking Inside the Black-Box: A Survey on Explainable Artificial Intelligence (XAI)," IEEE Access, vol. 6, Oct. 12, 2018, pp. 52138-52160, <https://ieeexplore.ieee.org/document/8466590>.

Arya, et al., "One Explanation Does Not Fit All: A Toolkit and Taxonomy of AI Explainability Techniques," arXiv:1909.03012v2 [cs.AI], Sep. 14, 2019, 18 pgs, <https://arxiv.org/abs/1909.03012>.

Duval, "Explainable Artificial Intelligence (XAI)," ResearchGate, Preprint Apr. 2019, 58 pgs., <https://www.researchgate.net/publication 332209054_Explainable_Artificial_Intelligence_XAI?channel=doi&linkId=5ca6269aa6fdcca26dfec0cd&showFulltext=true>.

Mell et al., "The NIST Definition of Cloud Computing", National Institute of Standards and Technology, Special Publication 800-145, Sep. 2011, pp. 1-7.

Santana, "Welfit: A Remote Evaluation Tool for Identifying Web Usage Patterns Through Client-Side Logging," Science Direct, Elsevier, Int. J. Human-Computer Studies vol. 76 (2015), pp. 40-49, <https://www.sciencedirect.com/science/article/abs/pii/S1071581914001682>.

Santana, et al., "Summarizing Observational Client-side Data to Reveal Web Usage Patterns," SAC '10, Mar. 22-26, 2010, Sierre Switzerland, pp. 1219-1223, <https://dl.acm.org/doi/10.1145/1774088.1774344>.

W3Schools, "HTML Dom Events," W3Schools.com, [accessed May 2, 2022], 19 pgs., Retrieved from the Internet: <https://www.w3schools.com/jsref/dom_obj_event.asp>.

* cited by examiner

100

Data Storage
Device 106

Processor
104

Software
Program
108

Computer 102

Communication Network
110

Database
112

XAI Prediction
Program
116

Server Computer 114

300

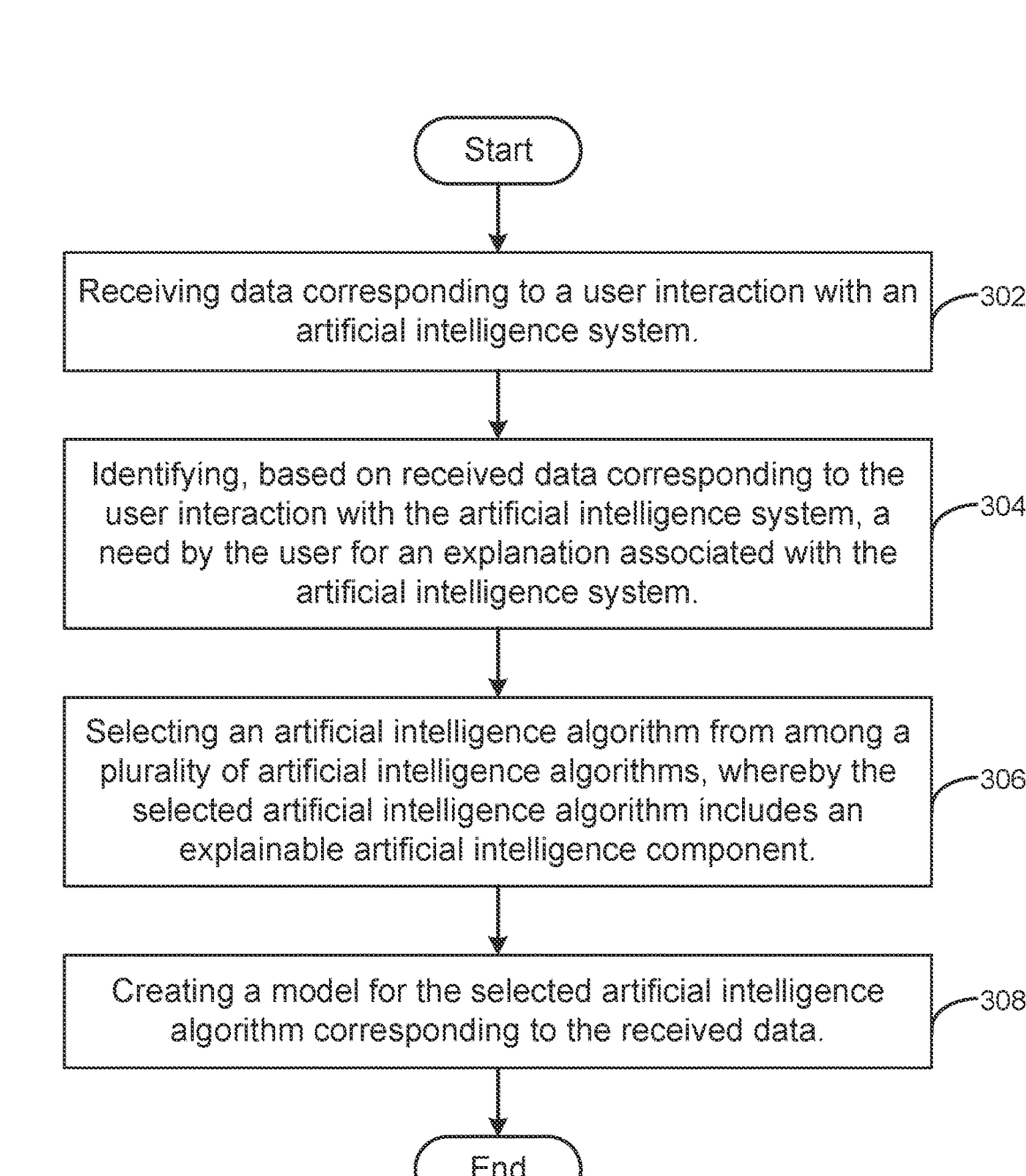

Start

Receiving data corresponding to a user interaction with an artificial intelligence system. —302

Identifying, based on received data corresponding to the user interaction with the artificial intelligence system, a need by the user for an explanation associated with the artificial intelligence system. —304

Selecting an artificial intelligence algorithm from among a plurality of artificial intelligence algorithms, whereby the selected artificial intelligence algorithm includes an explainable artificial intelligence component. —306

Creating a model for the selected artificial intelligence algorithm corresponding to the received data. —308

End

FIG. 3

PREDICTING THE NEED FOR XAI IN ARTIFICIAL INTELLIGENCE SYSTEMS

FIELD

This disclosure relates generally to field of machine learning, and more particularly to explainable artificial intelligence (XAI).

BACKGROUND

Explainable artificial intelligence (XAI) is a technique to generate an explanation for an artificial intelligence (AI) model's output or behavior. Each AI model has explanation evaluation criteria, which are desirable properties that an AI explanation should be judged by. These include the model being complete, generalizable, compact, stable, etc.

SUMMARY

Embodiments relate to a method, system, and computer readable medium for selecting an artificial intelligence algorithm. According to one aspect, a method for selecting an artificial intelligence algorithm is provided. The method may include receiving data corresponding to a user interaction with an artificial intelligence system. A need by the user for an explanation associated with the artificial intelligence system is identified based on the received data corresponding to the user interaction with the artificial intelligence system. An artificial intelligence algorithm is selected from among a plurality of artificial intelligence algorithms. The selected artificial intelligence algorithm includes an explainable artificial intelligence component. A model is created for the selected artificial intelligence algorithm corresponding to the received data.

According to another aspect, a computer system for selecting an artificial intelligence algorithm is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving data corresponding to a user interaction with an artificial intelligence system. A need by the user for an explanation associated with the artificial intelligence system is identified based on the received data corresponding to the user interaction with the artificial intelligence system. An artificial intelligence algorithm is selected from among a plurality of artificial intelligence algorithms. The selected artificial intelligence algorithm includes an explainable artificial intelligence component. A model is created for the selected artificial intelligence algorithm corresponding to the received data.

According to yet another aspect, a computer readable medium for selecting an artificial intelligence algorithm is provided. The computer readable medium may include one or more computer-readable storage devices and program instructions stored on at least one of the one or more tangible storage devices, the program instructions executable by a processor. The program instructions are executable by a processor for performing a method that may accordingly include receiving data corresponding to a user interaction with an artificial intelligence system. A need by the user for an explanation associated with the artificial intelligence system is identified based on the received data corresponding to the user interaction with the artificial intelligence system. An artificial intelligence algorithm is selected from among a plurality of artificial intelligence algorithms. The selected artificial intelligence algorithm includes an explainable artificial intelligence component. A model is created for the selected artificial intelligence algorithm corresponding to the received data.

According to one or more aspects, the artificial intelligence algorithm is selected based on previous user interactions with the artificial intelligence system selecting an artificial intelligence algorithm having an explainable artificial intelligence component.

According to one or more aspects, the method may further include training the model based on measuring a similarity value between the received data and data corresponding to previous user interactions having a need for an explanation associated with the artificial intelligence system.

According to one or more aspects, identifying the need by the user for the explanation associated with the artificial intelligence system includes creating embeddings based on the received data corresponding to the user interaction with the artificial intelligence system, calculating a similarity value between the embeddings, and determining the need for the explanation based on the calculated similarity value.

According to one or more aspects, the similarity value corresponds to a cosine similarity value between vectors associated with the created embeddings.

According to one or more aspects, the method may further include providing an explanation of the artificial intelligence algorithm to the user.

According to one or more aspects, the data corresponding to the user interaction with the artificial intelligence system includes data corresponding to an identifier, a timestamp, an event, a target, and metadata.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings:

FIG. 3 is an operational flowchart illustrating the steps carried out by a program that selecting an artificial intelligence algorithm, according to at least one embodiment;

DETAILED DESCRIPTION

Figure 1:
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of machine learning, and more particularly to explainable artificial intelligence (XAI). The following described exemplary embodiments provide a system, method, and computer program to, among other things, select an AI algorithm based on a need for XAI. Therefore, some embodiments have the capacity to improve the field of computing by allowing for prediction of whether an explanation of the operation of an AI system is needed in selecting an AI algorithm from among a pool of AI algorithms available to an automated machine learning (AutoML) or automated artificial intelligence (AutoAI) system.

As previously described, explainable artificial intelligence (XAI) is a technique to generate an explanation for an artificial intelligence (AI) model's output or behavior.

There are several reasons for which XAI may be used. These include explaining to justify, explaining to control, explaining to improve, and explaining to discover. In explaining to justify, XAI systems provide required information to justify its results, particularly when unexpected decisions or outputs are provided. This is particularly important when there is a need for auditable way to defend decisions as being fair and ethical. In explaining to control, XAI systems provide information to help rapidly identify and correct errors (e.g., debugging) in low criticality situations. In explaining to improve, XAI systems provide information to support their own improvement, in a human-in-the-loop or symbiotic way, supporting ongoing iteration of models based on the interaction/dialogues between human and machine. In explaining to discover, XAI systems use the explanations to learn new facts, gathering information and gaining knowledge. This can only be done in explainable AI systems.

Each AI model has explanation evaluation criteria, which are desirable properties that an AI explanation should be judged by. These include the model being complete, generalizable, compact, stable, etc. Explanation evaluation criteria may include, among other things:

Fidelity: the explanation is truthful to the process of how the model makes prediction(s), regardless of the complexity.

Completeness: the explanation covers many model behaviors or generalizes to many model decisions.

Stability: the explanation remains consistent for similar cases the explainee asks about.

Certainty: the explanation reflects the confidence of the model for inquired cases, so the explainee knows when the model is uncertain.

Compactness: the explanation gives only necessary information and does not overwhelm.

Comprehensibility: the explanation is easy to understand

Actionability: the explanation helps the explainee determine follow-up actions to achieve my goal for the task Interactivity: the explanation is interactive, so the explainee can ask follow-up questions.

Translucence: the explanation is transparent about its limitations, for examples the conditions for it to hold Coherence: the explanation is consistent with the explainee's prior knowledge about the domain Novelty: the explanation provides new or surprising information that the explainee otherwise would not expect Personalization: the explanation is tailored to the explainee's needs and preferences, e.g. level of details, communication styles, language, etc.

Some artificial intelligence systems match budget constraints, time constraints, dataset characteristics, and goal metrics to select the appropriate AI algorithms. However, with recent advances on XAI and recent regulatory policies (e.g., the European Union's General Data Protection Regulation), one more variable needs to be considered: the need for XAI. For example, under the GDPR, a data controller must inform a data subject on details about processing of personal data, such as the purposes of the processing. Thus, XAI may be needed for compliance with GDPR by generating explanations related to processing of the user's data. AI algorithms differ in terms of accuracy, speed, and XAI capabilities. Beyond needs of accuracy and speed, AI algorithms may be favored based on considering the need for explanations. It may be advantageous, therefore, to predict when the user will interact with XAI in order to support the selection of AI algorithms to be considered. The method, computer system, and computer program product disclosed herein may employ a usage graph structure representing previous users' interactions using node2vec to create embeddings and a classifier to predict whether the user will interact with the XAI in the current context.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

The following described exemplary embodiments provide a system, method and computer program that determines whether an explanation is needed for an artificial intelligence system in order to select an appropriate artificial intelligence algorithm. The method, computer system, and computer program product disclosed herein may be used for predicting how people will interact with XAI (need for XAI) during the interaction with artificial intelligence systems. The embodiments disclosed herein may also analyze how a need for XAI changes over time through a learning or trust curve. The artificial intelligence system can make an informed decision on what types of algorithms to consider combining budget constraints, time constraints, dataset characteristics, goal metrics, and a need for XAI.

Referring now to FIG. 1, a functional block diagram of a networked computer environment illustrating an artificial intelligence algorithm selection system 100 (hereinafter "system") for selecting an artificial intelligence algorithm based on a need for an explanation and whether the algorithm has XAI capabilities. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 4 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 5 and 6. The server computer 114 may also be located in a cloud computing deployment model, such as a private cloud, community cloud, public cloud, or hybrid cloud.

The server computer 114, which may be used for selecting an artificial intelligence algorithm based on a predicted need for XAI is enabled to run an XAI Prediction Program 116 (hereinafter "program") that may interact with a database 112. The XAI Prediction Program is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger XAI prediction program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
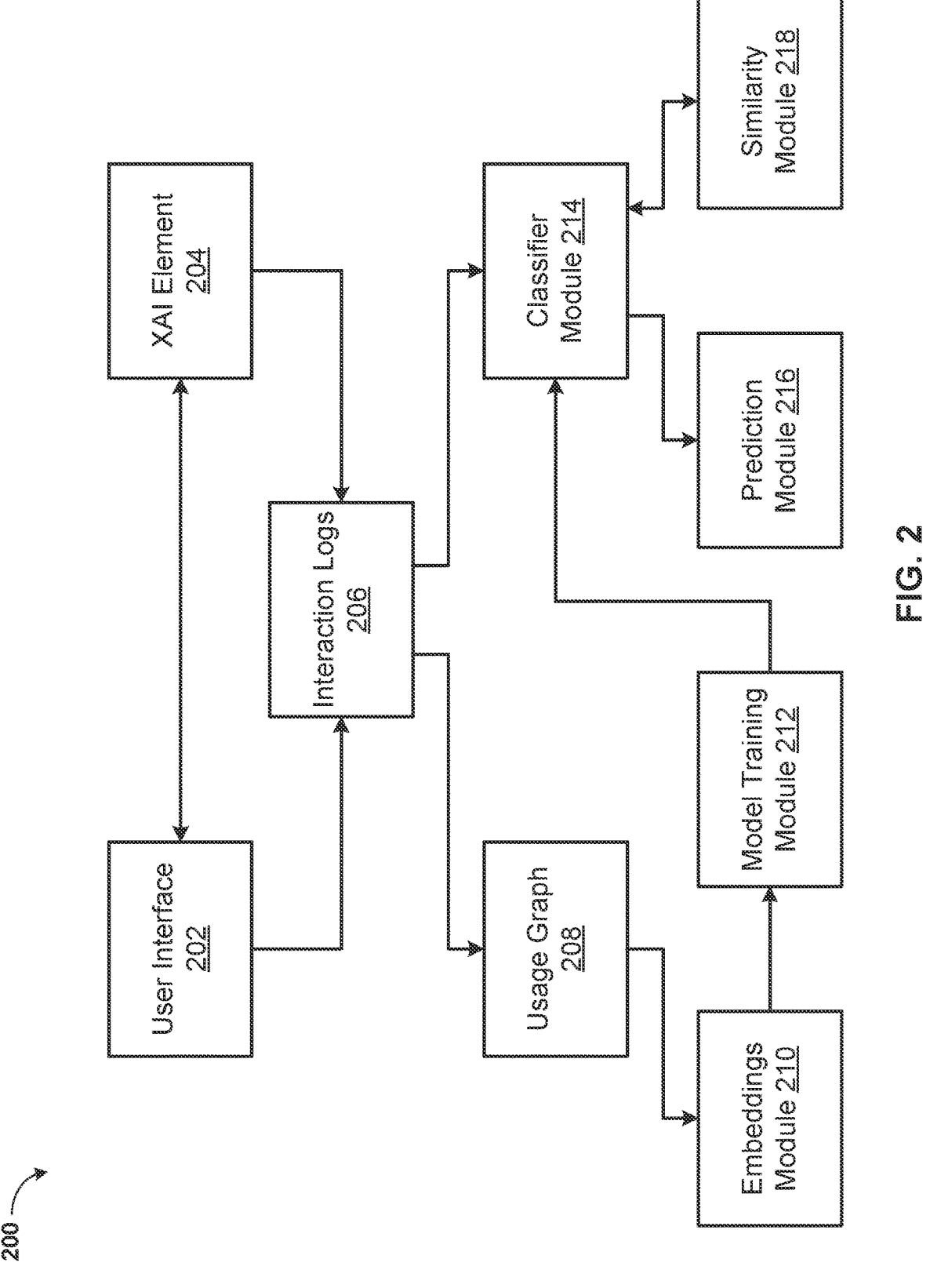
FIG. 2 is a block diagram of a system for selecting an artificial intelligence algorithm based on determining a need for an explanation of the artificial intelligence algorithm, according to at least one embodiment.

Referring now to FIG. 2, an artificial intelligence system 200 is depicted according to one or more embodiments. The artificial intelligence system 200 may include, among other things, a user interface 202, an XAI element 204, interaction logs 206, a usage graph 208, an embeddings module 210, a model training module 212, a classifier module 214, a label prediction module 216, and a similarity module 218. The artificial intelligence system 200 may be divided into a training component and a prediction component. The training component may include the user interface 202, the XAI element 204, the interaction logs 206, the usage graph 208, the embeddings module 210, and the model training module 212. The prediction component may include the user interface 202, the interaction logs 206, the classifier module 214, the prediction module 216, and the similarity module 218.

The user interface 202 may receive an input from a user. The user interface 202 may be a laptop computer, desktop computer, smartphone, or the like. The user interface 202 may receive a user's interaction with an artificial intelligence system, such as the XAI element 204. The user interface 202 may receive data related to a user selection of a dataset for processing by the artificial intelligence system 200. The user, therefore, may interact with the artificial intelligence system 200 through the user interface 202 by selecting/uploading the dataset to be used. The user may also perform configuration of the artificial intelligence system 200 through the user interface 202 prior to requesting the model to be created.

The XAI element 204 may capture user interactions with the artificial intelligence system 200. For example, the XAI element 204 may capture detailed interaction data such as mouse movements, clicks, drag-and-drop actions, key presses, shortcut keys, and the like. For a web-based system, any event accessible through the user interface can be logged by the XAI element 204. The XAI element may store the event streams as interaction data in the interaction logs 206. The interaction logs 206 may include an id, timestamp, event, target, and metadata. The XAI element 204 may use the detailed interaction data logged in the interaction logs 206 to create the usage graph 208 to represent user behaviors while interacting with the artificial intelligence system 200.

The embeddings module 210 may create embeddings based on the usage graph 208. The embeddings module 210 may use a given technique (e.g., node2vec) to create embeddings for the graph structure and convert the representation of each of the nodes in larger dimensions embedding space. The embeddings module 210 may, therefore, provide more information for the classification algorithm in such a way that closer nodes in the usage graph 208 are also closer in the embedding space since the usage graph 208 may indicate a non-rectangular nature of interaction events streams. Moreover, as part of the embeddings creation by the embeddings module 210, multiple random walks may be performed to augment possibilities of how users can interact with the UI elements logged in the interaction logs 206, which may increase the generalization power of the predictor.

The model training module 212 may train the classifier module 214 for identifying the need for XAI. With embeddings defined by the embeddings module 210, the artificial intelligence system 200 splits nodes into two classes: those with need for XAI and those with no need for XAI. The classifier module 214 may determine graph nodes that may not be related to XAI elements (e.g., using the labeling event@UI_element[#element ID] structure, mouseover@ select #model) but that may have high similarity (e.g., cosine similarity) with nodes related to XAI (e.g., click@div #modelExplainability). The model used here can be any model that works with similarity measures (e.g., Tree-based classifiers, Logistic classifier, etc.) as determined by the similarity module 218.

The prediction module 216 may predict the need for XAI for the user. The prediction module 216 may run the model trained by the model training module 212 using data from the interaction logs 206. The prediction module 216 may use cosine similarity to assess a probability of a user interacting with the XAI element 204. Cosine similarity may vary between −1 and 1, where −1 may indicate that two vectors created by the embeddings module 210 through node2vec are pointing to opposite directions, 0 may indicate the vectors are orthogonal, and 1 may indicate that the two vectors are pointing to the same direction. Thus, as a node similarity increases, a user interaction with the XAI element 204 is more likely to occur, which may cause the prediction module 216 to select an artificial intelligence algorithm having XAI from a pool of artificial intelligence algorithms and architectures available to an automated machine learning (AutoML) or automated artificial intelligence (AutoAI) system, such as but not limited to deep neural networks, deep position-wise interaction network, position-wise area under curve, skip-gram neural networks, or logistic regression classification. It may be appreciated that substantially any artificial intelligence algorithm or architecture, both with explainable artificial intelligence capabilities and without, may be available within the pool of artificial intelligence algorithms.

The prediction module 216 may create a model for the selected artificial intelligence algorithm. The model may be created based on a request received through the user interface 202. The user may request the model training module 212 train the model based on a set of common constraints as time, budget, accuracy, task completion, or other metrics. The prediction module 216 may create a model balancing common constraints and need for XAI. The prediction module 216 may balances the common constrains plus the need for XAI or may balance the model using common constraints. The artificial intelligence system 200 may provide feedback related to the created model back to the user through the user interface 202 and may confirm the prediction with how the user interacts and triggers events through the user interface 202.

Referring now to FIG. 3, an operational flowchart illustrating the steps of a method 300 carried out by a program that selects an AI algorithm based on a predicted need for XAI is depicted. The method 300 may be described with the aid of the exemplary embodiments depicted in FIGS. 1 and 2.

At 302, the method 300 may include receiving data corresponding to a user interaction with an artificial intelligence system. The data corresponding to the user interaction with the artificial intelligence system includes data corresponding to an identifier, a timestamp, an event, a target, and metadata. In operation, the artificial intelligence system 200 (FIG. 2) may receive data corresponding to user interactions through the user interface 202 (FIG. 2). The user interaction data may be received from the software program 108 (FIG. 1) on the computer 102 (FIG. 1) via the communication network 110 (FIG. 1) or may retrieve the interaction data from the database 112 (FIG. 1) on the server computer 114 (FIG. 1). The user interaction data may be stored in the interaction logs 206 (FIG. 2) in the database 112 on the server computer 114.

At 304, the method 300 may include identifying, based on received data corresponding to the user interaction with the artificial intelligence system, a need by the user for an explanation associated with the artificial intelligence system. This may include creating embeddings based on the received data corresponding to the user interaction with the artificial intelligence system, calculating a similarity value between the embeddings, and determining the need for the explanation based on the calculated similarity value. The similarity value corresponds to a cosine similarity value between vectors associated with the created embeddings. In operation, the usage graph 208 (FIG. 2) may be created based on the user interaction data stored in the interaction logs 206 (FIG. 2). The embeddings module 210 (FIG. 2) may create embeddings based on the usage graph that may be used to train the model training module 212 (FIG. 2). The model training module 212 may pass the embeddings to the classifier module 214 (FIG. 2.) for determining whether nodes in the embeddings require the need for XAI. The similarity module 218 (FIG. 2) may determine the similarity values between the embeddings. The prediction module 216 (FIG. 2) may determine that XAI is needed based on the similarity data.

At 306, the method 300 may include selecting an artificial intelligence algorithm from among a plurality of artificial intelligence algorithms, wherein the selected artificial intelligence algorithm includes an explainable artificial intelligence component. The artificial intelligence algorithm is selected based on previous user interactions with the artificial intelligence system selecting an artificial intelligence algorithm having an explainable artificial intelligence component. An explanation of the artificial intelligence algorithm may be provided to the user. In operation, the prediction module 216 selects an artificial intelligence algorithm from a pool of algorithms stored on the database 112 (FIG. 1).

At 308, the method 300 may include creating a model for the selected artificial intelligence algorithm corresponding to the received data. The model is trained based on measuring a similarity value between the received data and data corresponding to previous user interactions having a need for an explanation associated with the artificial intelligence system. In operation, prediction module 216 (FIG. 2) may generate a model for the XAI element 204 (FIG. 2) based on the artificial intelligence algorithm selected from the database 112 (FIG. 1). The XAI element 204 may provide an explanation of the artificial intelligence system 200 to a user and receive feedback from the user through the user interface 202 (FIG. 2).

It may be appreciated that FIG. 3 provides only an illustration of one implementation and does not imply any limitations with regard to how different embodiments may be implemented. Many modifications to the depicted environments may be made based on design and implementation requirements.

Figure 4:
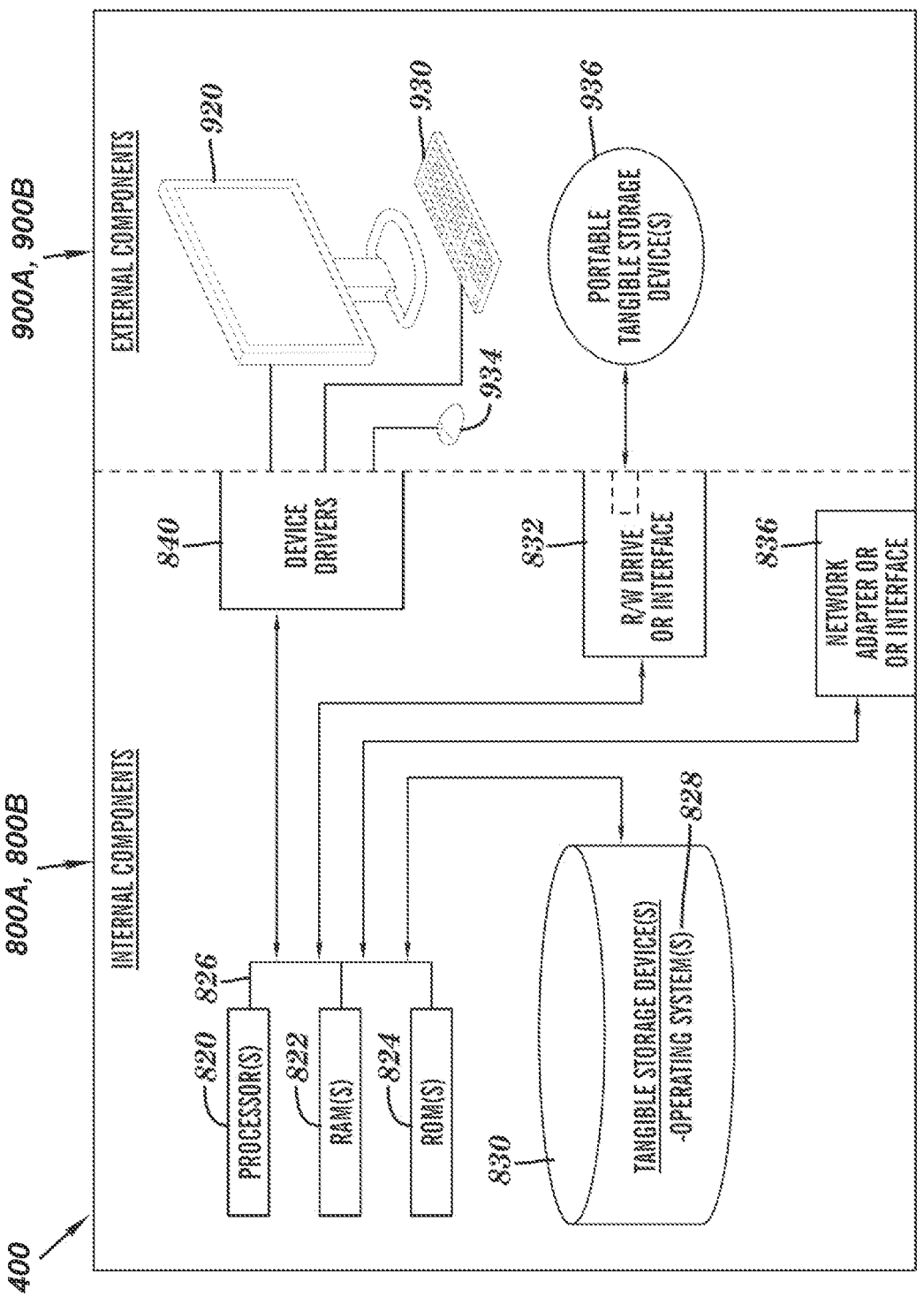
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Figure 5:
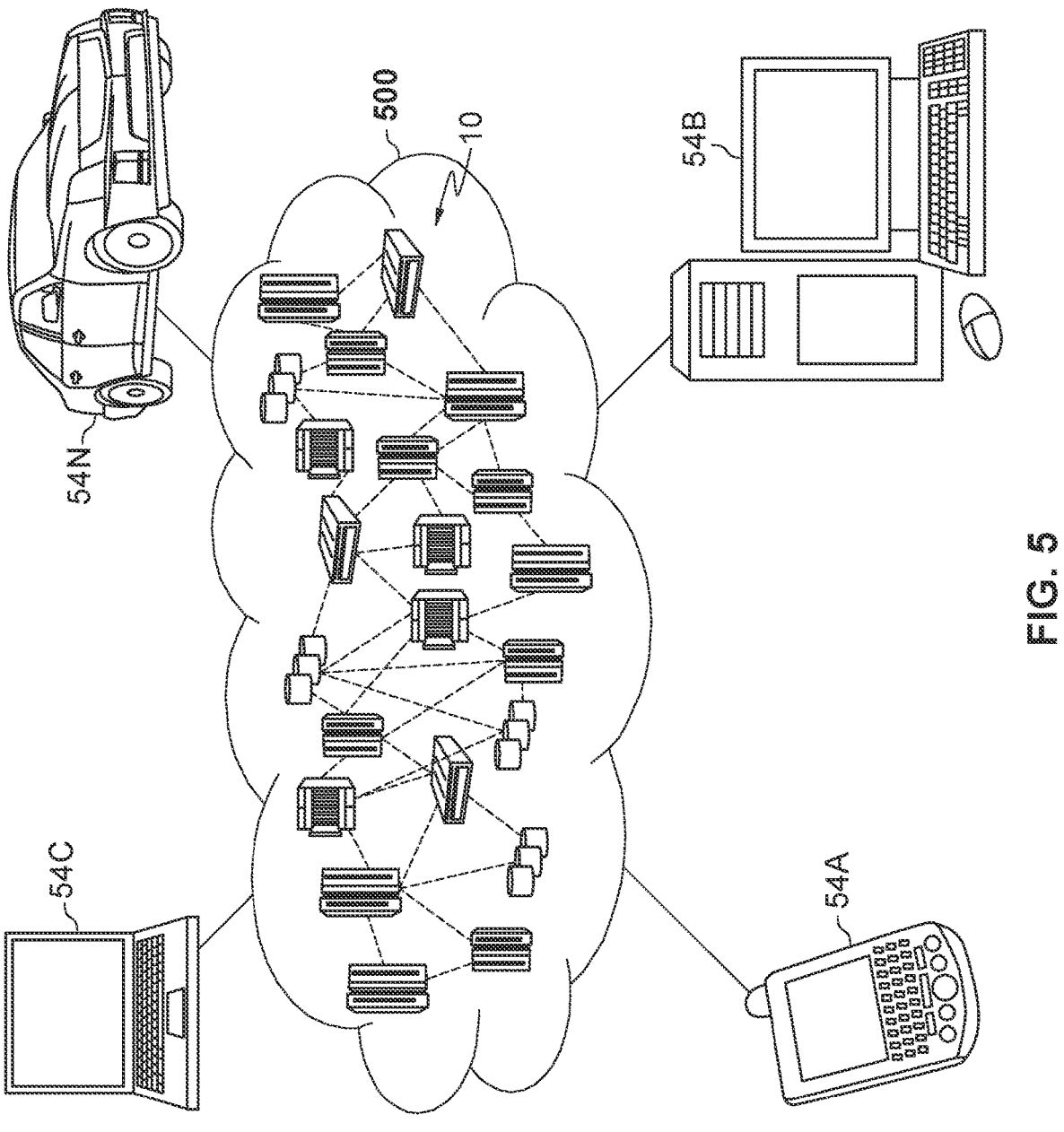
FIG. 5 is a block diagram of an illustrative cloud computing environment including the computer system depicted in FIG. 1, according to at least one embodiment.

Computer 102 (FIG. 1) and server computer 114 (FIG. 1) may include respective sets of internal components 800A,B and external components 900A,B illustrated in FIG. 5. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. The one or more buses 826 include a component that permits communication among the internal components 800A,B.

The one or more operating systems 828, the software program 108 (FIG. 1) and the XAI Prediction Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a magnetic tape, and/or another type of non-transitory computer-readable tangible storage device that can store a computer program and digital information.

Each set of internal components 800A,B also includes a RAY drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the XAI Prediction Program 116 (FIG. 1) can be stored on one or more of the respective portable computer-readable tangible storage devices 936, read via the respective RAY drive or interface 832 and loaded into the respective computer-readable tangible storage devices 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the XAI Prediction Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the XAI Prediction Program 116 on the server computer 114 are loaded into the respective computer-readable tangible storage devices 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in computer-readable tangible storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring to FIG. 5, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 500 can communicate with any type of computerized device over any type of network and/or network addressable connection (e.g., using a web browser).

Figure 6:
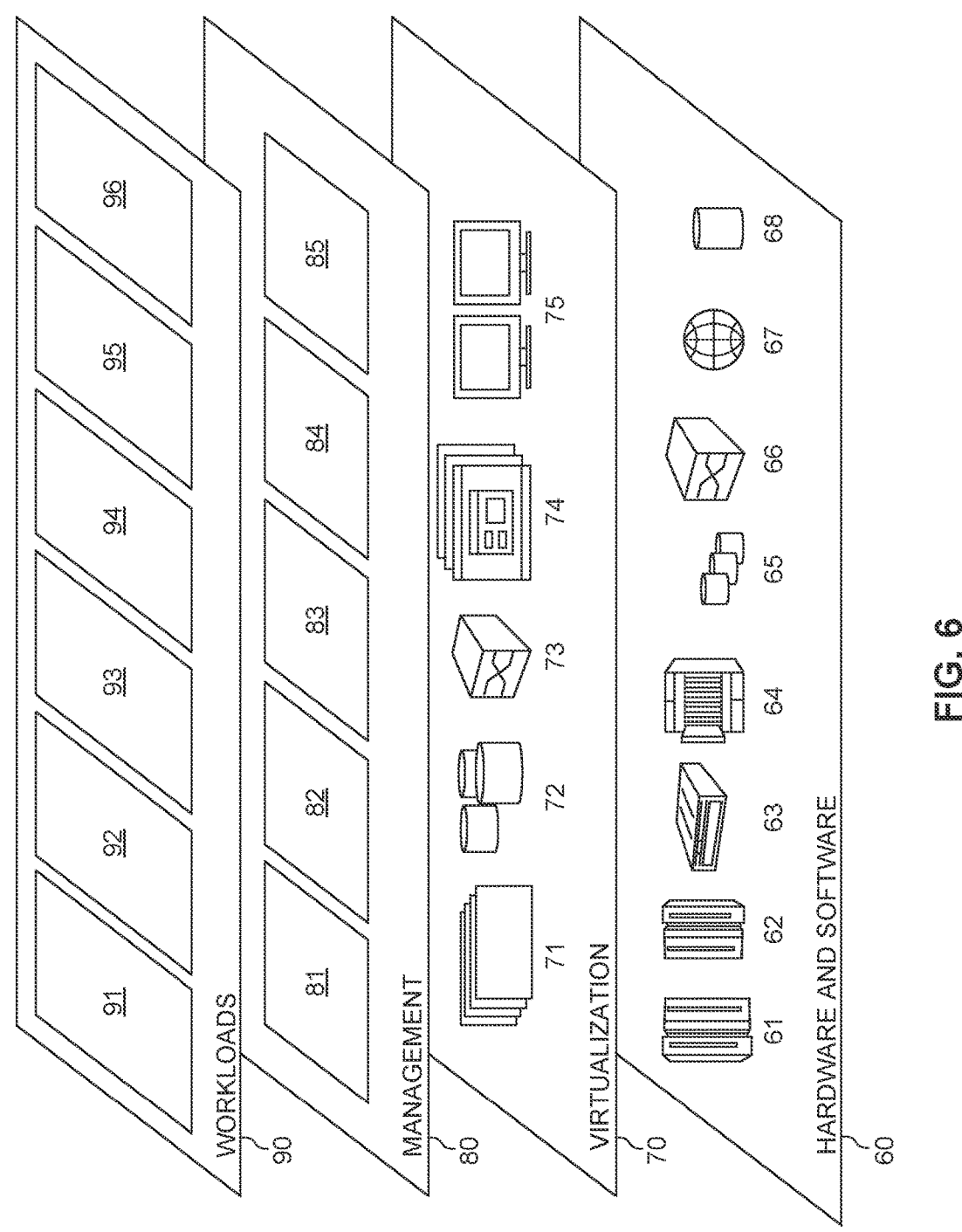
FIG. 6 is a block diagram of functional layers of the illustrative cloud computing environment of FIG. 5, according to at least one embodiment.

Referring to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and XAI Prediction 96. XAI Prediction 96 may select an AI algorithm based on a predicted need for XAI.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of selecting an artificial intelligence algorithm, executable by a processor, comprising:

receiving received data corresponding to a user interaction in a user interface with an artificial intelligence system, wherein the received data includes a dataset selected by a user in the user interface, wherein the user interaction includes an event and a target;

creating embeddings based on the received data and a usage graph used to train a model training module, wherein the usage graph comprises events and targets of users interacting with the artificial intelligence system;

calculating a similarity value between the embeddings;

identifying a need by the user for an explanation associated with the artificial intelligence system based on the similarity value;

selecting an artificial intelligence algorithm from among a plurality of artificial intelligence algorithms, wherein the selected artificial intelligence algorithm includes an explainable artificial intelligence component;

creating a model for the selected artificial intelligence algorithm corresponding to the received data; and providing feedback related to the created model back to the user through the user interface.

2. The computer-implemented method of claim 1, wherein the artificial intelligence algorithm is selected based on previous user interactions with the artificial intelligence system selecting an artificial intelligence algorithm having an explainable artificial intelligence component.

3. The computer-implemented method of claim 1, further comprising training the model based on measuring a similarity value between the received data and data corresponding to previous user interactions having a need for an explanation associated with the artificial intelligence system.

4. The computer-implemented method of claim 1, wherein the similarity value corresponds to a cosine similarity value between vectors associated with the created embeddings.

5. The computer-implemented method of claim 1, further comprising providing an explanation of the artificial intelligence algorithm to the user.

6. The computer-implemented method of claim 1, wherein the data corresponding to the user interaction with the artificial intelligence system includes data corresponding to an identifier, a timestamp, an event, a target, and metadata.

7. A computer system for selecting an artificial intelligence algorithm, the computer system comprising:

one or more computer-readable storage media configured to store computer program code; and one or more computer processors configured to access said computer program code and operate as instructed by said computer program code, said computer program code including:

receiving code configured to cause the one or more computer processors to receive received data corresponding to a user interaction in a user interface with an artificial intelligence system, wherein the received data includes a dataset selected by a user in the user interface, wherein the user interaction includes an event and a target;

creating code configured to cause the one or more computer processors to create embeddings based on the received data and a usage graph used to train a model training module, wherein the usage graph comprises events and targets of users interacting with the artificial intelligence system;

calculating code configured to cause the one or more computer processors to calculate a similarity value between the embeddings;

identifying code configured to cause the one or more computer processors to identify a need by the user for an explanation associated with the artificial intelligence system based on the similarity value;

selecting code configured to cause the one or more computer processors to select an artificial intelligence algorithm from among a plurality of artificial intelligence algorithms, wherein the selected artificial intelligence algorithm includes an explainable artificial intelligence component;

creating code configured to cause the one or more computer processors to create a model for the selected artificial intelligence algorithm corresponding to the received data; and providing feedback related to the created model back to the user through the user interface.

8. The computer system of claim 7, wherein the artificial intelligence algorithm is selected based on previous user interactions with the artificial intelligence system selecting an artificial intelligence algorithm having an explainable artificial intelligence component.

9. The computer system of claim 7, further comprising training code configured to cause the one or more computer processors to train the model based on measuring a similarity value between the received data and data corresponding to previous user interactions having a need for an explanation associated with the artificial intelligence system.

10. The computer system of claim 7, wherein the similarity value corresponds to a cosine similarity value between vectors associated with the created embeddings.

11. The computer system of claim 7, further comprising providing code configured to cause the one or more computer processors to provide an explanation of the artificial intelligence algorithm to the user.

12. The computer system of claim 7, wherein the data corresponding to the user interaction with the artificial intelligence system includes data corresponding to an identifier, a timestamp, an event, a target, and metadata.

13. A computer readable medium having stored thereon a computer program for selecting an artificial intelligence algorithm, the computer program configured to cause one or more computer processors to:

receive received data corresponding to a user interaction in a user interface with an artificial intelligence system, wherein the received data includes a dataset selected by a user in the user interface, wherein the user interaction includes an event and a target;

create embeddings based on the received data and a usage graph used to train a model training module, wherein the usage graph comprises events and targets of users interacting with the artificial intelligence system;

calculate a similarity value between the embeddings;

identify a need by the user for an explanation associated with the artificial intelligence system based on the similarity value;

select an artificial intelligence algorithm from among a plurality of artificial intelligence algorithms, wherein the selected artificial intelligence algorithm includes an explainable artificial intelligence component;

create a model for the selected artificial intelligence algorithm corresponding to the received data; and providing feedback related to the created model back to the user through the user interface.

14. The computer readable medium of claim 13, wherein the artificial intelligence algorithm is selected based on previous user interactions with the artificial intelligence system selecting an artificial intelligence algorithm having an explainable artificial intelligence component.

15. The computer readable medium of claim 13, wherein the computer program is further configured to cause the one or more computer processors to train the model based on measuring a similarity value between the received data and data corresponding to previous user interactions having a need for an explanation associated with the artificial intelligence system.

16. The computer readable medium of claim 13, wherein the similarity value corresponds to a cosine similarity value between vectors associated with the created embeddings.

17. The computer readable medium of claim 13, wherein the computer program is further configured to cause the one or more computer processors to provide an explanation of the artificial intelligence algorithm to the user.

* * * * *